United States Patent [19]

Lenz

[11] Patent Number: 4,885,881
[45] Date of Patent: Dec. 12, 1989

[54] BOTTOM SEAL FOR L-PAD DOCK SHELTER

[75] Inventor: Kenneth Lenz, East Dubuque, Ill.

[73] Assignee: Frommelt Industries, Inc., Dubuque, Iowa

[21] Appl. No.: 318,704

[22] Filed: Mar. 3, 1989

[51] Int. Cl.[4] .............................................. E04N 14/00
[52] U.S. Cl. ................................................ 52/173 DS
[58] Field of Search .................... 52/173 DS, 204, 288; 49/485, 496, 498

[56] References Cited

U.S. PATENT DOCUMENTS

| | | |
|---|---|---|
| Re. 28,391 | 4/1975 | Frommelt et al. |
| 2,727,596 | 12/1955 | Smith |
| 3,375,625 | 4/1968 | Edkins et al. |
| 3,403,489 | 10/1968 | Frommelt et al. |
| 3,653,173 | 4/1972 | Frommelt et al. |
| 3,699,733 | 10/1972 | Frommelt et al. |
| 3,792,559 | 2/1974 | Frommelt et al. |
| 4,038,792 | 8/1977 | McGuire et al. |
| 4,062,157 | 12/1977 | Potthoff ................ 52/173 DS |
| 4,213,279 | 7/1980 | Layne |
| 4,223,487 | 9/1980 | St. Clair |
| 4,293,135 | 10/1981 | Wallace |
| 4,365,452 | 12/1982 | Fillman et al. |
| 4,381,631 | 5/1983 | Frommelt |
| 4,601,142 | 7/1986 | Frommelt |
| 4,718,207 | 1/1988 | Frommelt |
| 4,731,952 | 3/1988 | Mascotte |
| 4,799,342 | 1/1989 | Klevnsans ............ 52/173 DS |

FOREIGN PATENT DOCUMENTS 2927233 1/1981 Fed. Rep. of Germany.

OTHER PUBLICATIONS 6 pages of publication of Can.Pro Company, Division of J. M. Nash Co., of Fond du Lac, Wis. 54938, illustrating different types of Can.Pro dock shelters. (Publication data unknown).
Copy of Schematic Drawing of Fairbonr Industries, Inc., Upper Sandusky, Ohio 43351, entitled "Rigid Truck Shelter". (Copyright 1976).

Primary Examiner—Richard E. Chilcot, Jr.
Attorney, Agent, or Firm—Emrich & Dithmar

[57] ABSTRACT

A bottom seal for an L-shaped dock shelter pad is tapered upwardly in the general form of a pyramid and is positioned in tight-fitting relation to the inner corner of the L-pad. The sloped upper surface of the bottom seals's compressible, resilient core and covered with a flexible, water-repellent, wear resistant material, while its bottom surface is covered with mesh material which allows for drainage/drying of the pad core and allows it to "breathe". The top corner of the bottom seal is coupled to the L-pad's inner corner to prevent sagging of the bottom seal, while one of its lower corners is also coupled to the L-pad's inner corner to maintain intimate contact between pad and seal even when engaged and compressed by a vehicle. The sloped upper surfaces of the bottom seal prevent debris from collecting within the L-pad while its upwardly tapered shape allows the bottom seal to fill the entire gap between the L-pad and adjacent wall regardless of the extent to which the L-pad is deflected or bent. Its tapered shape allows the bottom seal to provide decreasing resistance to flexure of the L-pad in an upward direction when the L-pad is engaged and deflected.

16 Claims, 3 Drawing Sheets

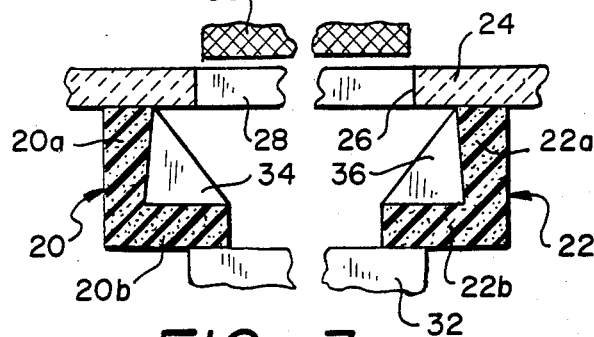
FIG. 1 (PRIOR ART)
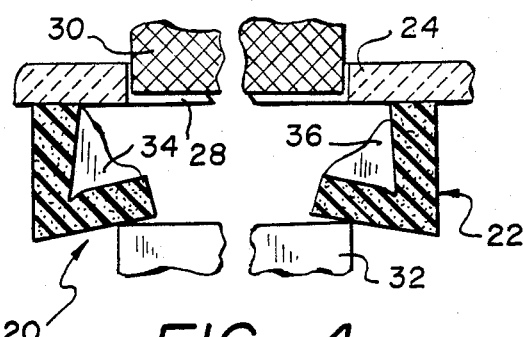
FIG. 2 (PRIOR ART)
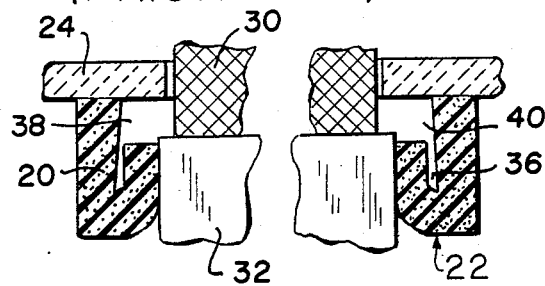
FIG. 3 (PRIOR ART)
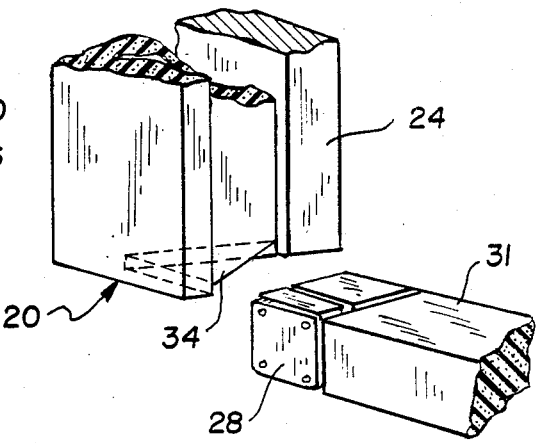
FIG. 4 (PRIOR ART)
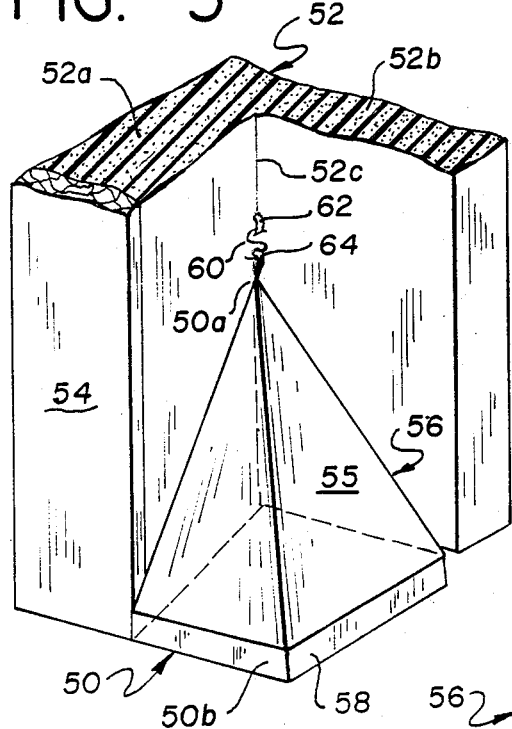
FIG. 5
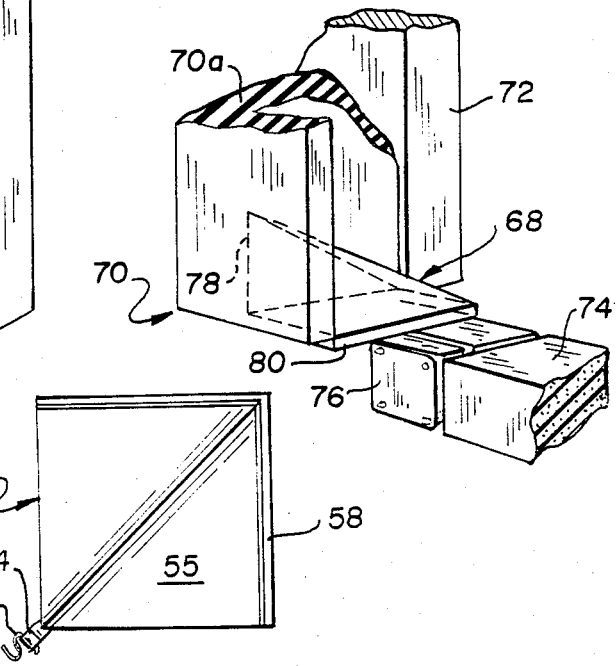
FIG. 6
FIG. 10

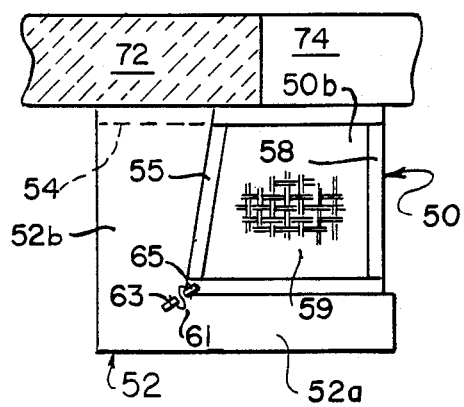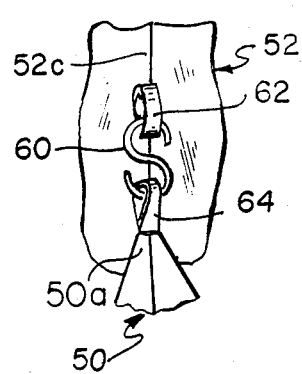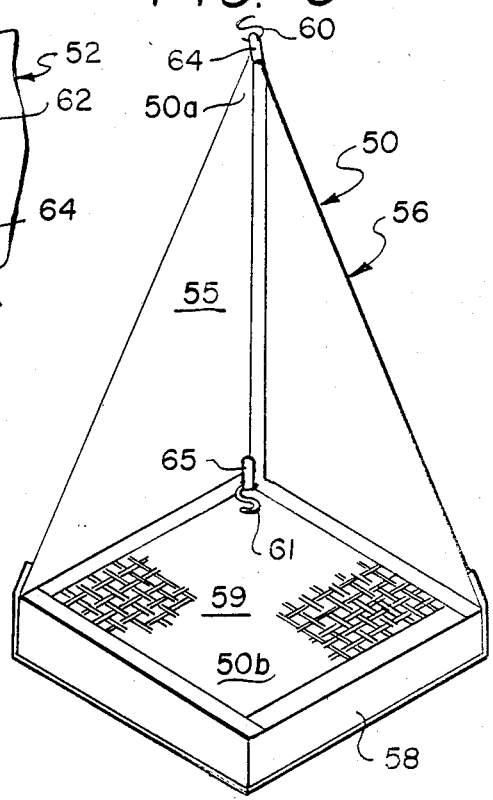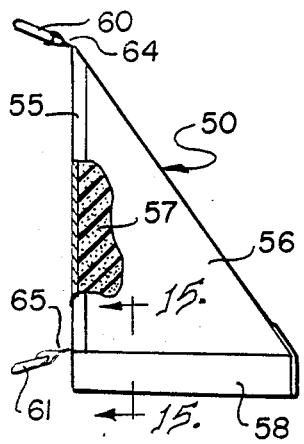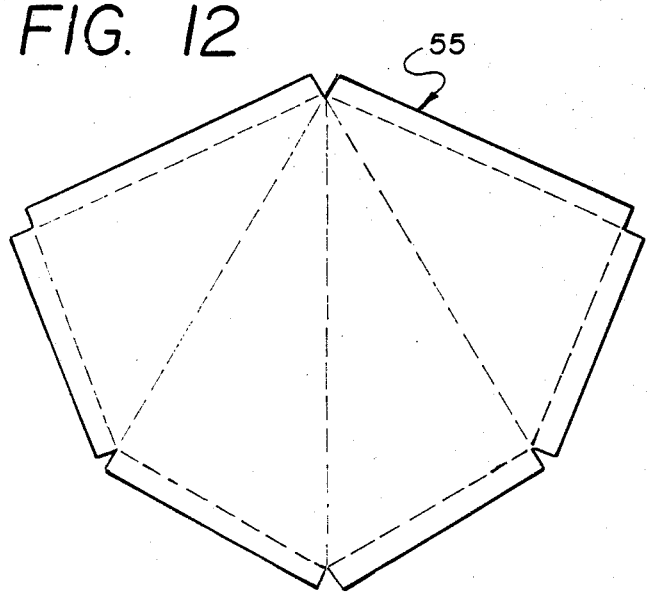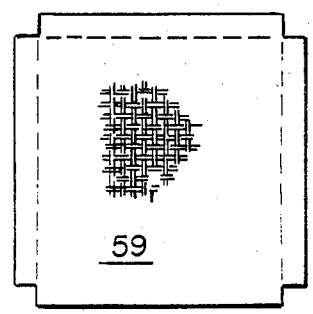

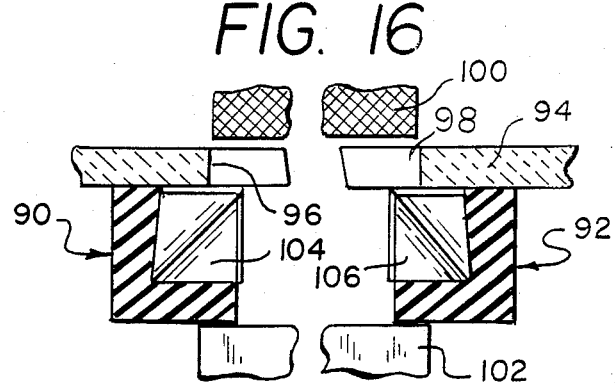
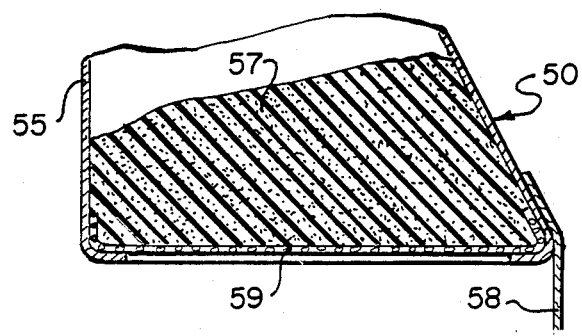
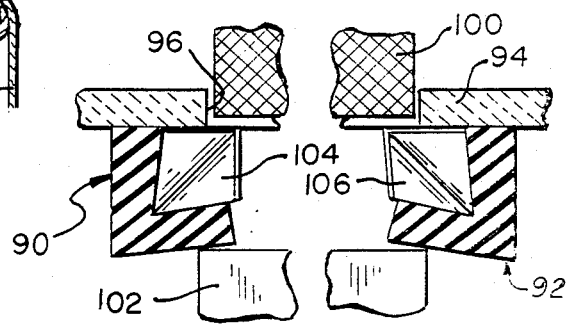
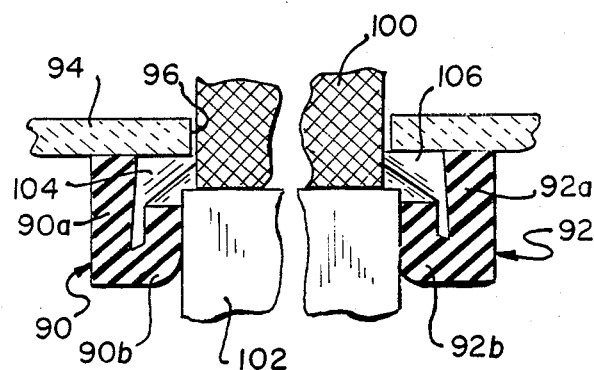

4,885,881

BOTTOM SEAL FOR L-PAD DOCK SHELTER

BACKGROUND OF THE INVENTION

This invention relates generally to loading dock shelters and is particularly directed to a bottom seal for a loading dock shelter of the L-shaped pad type.

Loading dock shelters having an L-pad are used to provide a seal between a building wall and a vehicle such as a truck which is being loaded or unloaded through an open doorway in the wall. These L-pad structures generally include a pair of L-shaped pads positioned adjacent to facing lateral edges of the doorway in combination with a head seal disposed over the doorway. Each of the L-pads includes a body portion extending generally perpendicularly outward from the wall and a leg portion extending from the distal end of the body portion generally parallel to the wall and inwardly toward the doorway. Each of the L-pads is comprised of a compressible, resilient material such that when its leg portion is engaged and deflected inwardly by a truck, the L-pad flexes inwardly while remaining in contact with an aft lateral edge of the truck. The head pad prevents the movement of air through the doorway above the truck, while either a lower bumper pad or dock leveler extending outward from the loading dock blocks movement of air through the doorway from beneath the truck. However, gaps on each side of the truck adjacent lower portions of each of the L-pads allow the movement of air through the doorway during loading/unloading of a truck using the dock shelter. This air movement exposes the inside of the building into or out of which goods are either being off-loaded from or on-loaded to the truck to the outside elements and is, of course, undesirable.

Prior attempts to seal off these gaps have made use of a flat, wedge shaped element coupled to a lower, inner edge of the L-pad. These wedge shaped elements are either comprised of a compressible, resilient material such as foam or a wear resistant, high strength flexible fabric. The foam-type wedge seal is intended to serve as a gusset behind the front face of the L-pad and to lend support to the pad. Unfortunately, the flat, wedge-like shape of these seals requires the exertion of large compressive forces to displace the L-pad so that it is in sealed conformance with the aft edge of a truck. In addition, these prior art compressible bottom seals provide support only for that portion of the L-pad with which it is in contact. Consequently, the application of large compressive forces for extended periods of time to those portions of the L-pad not adjacent to the gusset result in those portions of the L-pad becoming permanently mishappen. Once a dock shelter pad takes an irregular "set", its ability to form a seal with an edge of the truck is substantially impaired. Moreover, these prior art bottom seals do not completely fill the gap adjacent the lower edge of the L-pad and thus did not adequately seal the lower portion of the truck-wall interface. Finally, these prior art seals became misshapen not only from the large compressive forces applied by a truck using the dock seal, but also because the bottom seal tends to sag and to assume a curved shape. This further reduces the capability of the bottom seal to fill the gap adjacent to the lower, lateral edge of the rear of the truck.

The present invention overcomes the aforementioned limitations of the prior art by providing a pyramidal-shaped bottom seal for an L-pad dock shelter which remains in intimate contact with the L-pad and completely fills the gap adjacent to the lower edge of the L-pad regardless of the extent to which the pad and the bottom seal are compressed by a truck using the dock shelter. The upwardly tapered shape of the bottom seal reduces the compressive force which must be applied to the L-pad for compressive sealing with an aft edge of the truck, and biases the L-pad to its original shape when not in use. The pyramidal bottom seal is securely attached to the inner edge of the L-pad and includes a compressible, resilient foam core which is easily collapsed, but returns to its original shape almost immediately because of the "breathing" effect of the bottom seal's full mesh lower surface.

OBJECTS AND SUMMARY OF THE INVENTION

Accordingly, it is an object of the present invention to seal the lower end of an L-shaped loading dock shelter pad to prevent the movement of air through an opening in a wall through which a vehicle using the loading dock is being loaded or unloaded.

It is another object of the present invention to provide improved environmental isolation between the inside and outside of a building during loading/unloading of a vehicle through an opening in a wall of the building.

Yet another object of the present invention is to provide a bottom seal for an L-pad of a loading dock shelter which does not sag, is always in intimate contact with the L-pad, and assists the L-pad in maintaining its original shape when not engaged by a vehicle.

A further object of the present invention is to provide a bottom seal for an L-pad of a loading dock shelter which completely fills the gap between a lower portion of the L-pad and its support wall regardless of the extent of deflection of the L-pad by a vehicle without extending into the truck opening.

A still further object of the present invention is to provide a novel L-pad and bottom seal combination which is efficient and practical in operation and construction and which can be easily and economically manufactured.

The present invention contemplates a bottom seal for a loading dock shelter including an L-pad attached to a wall for engaging an aft portion of a truck positioned adjacent to the loading dock, wherein a portion of the L-pad is in spaced relation from the wall so as to form a gap therebetween; the bottom seal comprising: a compressible, resilient tapered pad having a generally flat base and an upper tapered portion forming an apex on the pad, wherein the base is positioned adjacent to and in contact with a lower edge of the L-pad and the wall adjacent thereto and fills the gap between the wall and the lower edge of the L-pad; and means for attaching the tapered pad to an inner portion of the L-pad facing the wall so as to maintain the tapered pad in intimate contact with the wall and an inner portion of the L-pad so that said tapered pad fills the gap therebetween when the L-pad is engaged and deflected by a truck.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 1, 2 and 3 are top sectional views of an L-pad dock shelter incorporating a prior art bottom seal which illustrate the displacement and reconfiguration of the dock shelter when engaged by a truck;

FIG. 4 is a perspective view shown partially in phantom of a prior art bottom seal for an L-pad positioned adjacent to a loading dock;

FIG. 5 is an upper perspective view of a bottom seal coupled to an L-pad in accordance with the present invention;

FIG. 6 is a perspective view shown partially in phantom of a bottom seal or an L-pad in accordance with the present invention shown positioned adjacent to a loading dock;

FIG. 7 shows details of the manner in which the bottom seal of invention is coupled to an L-pad;

FIG. 8 is a bottom plan view of the bottom seal of FIG. 5;

FIG. 9 is a lower perspective view of a bottom seal in accordance present invention;

FIG. 10 is a top plan view of the bottom seal of the present invention;

FIG. 11 is a partially cutaway side plan view of the bottom seal of the present invention;

FIG. 12 shows the shape of the cover of the bottom seal of the present invention;

FIG. 13 is a plan view of the mesh bottom used in the bottom seal of the present invention;

FIG. 14 is a plan view of a lower skirt, or flap, used in the bottom seal of the present invention;

FIG. 15 is a sectional view of a lower portion of the bottom seal of the present invention; and FIGS. 16 and 18 are top sectional views of a bottom seal for an L-pad in accordance with the present invention illustrating the undeflected configuration of the L-pad and bottom seal combination as well as the deflection of the L-pad and bottom seal when engaged by a truck.

DETAILED DESCRIPTION OF THE PREFERRED EMBODIMENT

Referring to FIGS. 1, 2 and 3, there is shown an L-pad dock shelter with a prior art bottom seal in both the undeflected and deflected configurations when engaged by a vehicle, such as a truck, 32. The prior art arrangement includes left and right L-pads 20, 22, where the designations "left" and "right" are taken as the dock shelter is viewed from outside a building having a wall 24 with an opening, or aperture, 26 therein. Disposed adjacent to a lower portion of the aperture 26 in the wall 24 is a bumper 28 which is adapted for engagement by an aft portion of a truck 32 using the dock shelter.

Each of the left and right L-pads 20, 22 includes a respective first body portion 20a, 22a. Each of the pad body portions 20a, 22a extends outwardly from the wall 24 in a generally perpendicular manner. Each of the left and right L-pads 20, 22 further includes a respective leg portion 20b and 22b. The L-pad leg portions 20b and 22b extend from respective distal ends of the body portions 20a and 22a toward the opening 26 in the wall 24. Each of the leg portions 20b and 22b is aligned generally parallel to the wall 24 and is adapted for engagement by a truck 32 positioned adjacent to the opening 26 in the wall 24 to allow for loading or unloading of the truck in a sealed manner with the wall.

As shown in FIG. 1, which illustrates the configuration of the L-pads 20 and 22 prior to engagement by the truck 32, the respective prior art bottom seals 34 and 36 of these L-pads are generally triangular. Each of these bottom seals 34, 36 is generally flat and positioned adjacent to the lower edge of its associated L-pad. Each of the bottom seals 34, 36 engages the inner surfaces of its respective L-pad and is maintained in contact with the inner corner of the L-pad adjacent to the lower end of the L-pad.

As shown in FIG. 2, upon initial engagement of the L-pads 20 and 22 by the vehicle 32, the leg portions of these L-pads are deflected inwardly toward the wall 24, compressing each of the bottom seals 34 and 36. Further rearward displacement of the truck 32 toward the wall 24 permits a dock leveler 30 to be extended from the loading dock onto an aft portion of the truck. Further displacement of the truck 32 also further deflects the leg portions 20b, 22b of the L-pads 20 and 22 so that the inner surfaces of the body and leg portions of each of these L-pads are in closely spaced relation. With the leg portions 20b, 22b of each of the L-pads 20 and 22 fully deflected as shown in FIG. 3, each of the respective bottom seals 34, 36 is fully compressed and positioned between adjacent leg and body portions of the L-pads or is deflected below the lower edge of the L-pad. As can be seen from FIG. 3, with the L-pads 20 and 22 fully deflected by a truck 32, openings 38 and 40 are located adjacent to lower, lateral portions of the aft end of the truck 32. These openings 38, 40 allow for the passage of air into and out of the opening within the wall 24 and thus expose the inside of the building, which includes wall 24, to the outside elements.

FIG. 4 is a perspective view shown partially in phantom of the prior art bottom seal 34 and L-pad 20 combination positioned adjacent to a loading dock. The loading dock includes a bumper 28 and a dock leveler 31 extending outward from the wall 24 below the aperture therein. The triangular shaped bottom seal 34 is positioned within and adjacent to the lower end of the L-pad 20. The bottom seal 34 is further positioned in general alignment with upper portions of the bumper 28 and dock leveler 31 and the lower end of the aperture in the wall.

Referring to FIG. 5, there is shown an upper perspective view of a bottom seal 50 positioned in an L-pad 52 in accordance with the principles of the present invention. FIG. 7 illustrates the manner in which an apex, or an upper pointed edge, 50a of the bottom seal 50 could be coupled to an inner edge 52c of the L-pad, while FIG. 8 is a bottom plan view of the bottom seal of FIG. 5. Although FIG. 7 shows an S-hook 60 connecting the bottom seal 50 and the L-pad 52, various other conventional coupling arrangements could be used equally as well. For example, the combination of a grommet inserted through the apex 50a of the bottom seal 50, a fabric loop in the L-pad 52 and a plastic tie could be used to couple the L-pad and the bottom seal. The L-pad 52 and bottom seal 50 combination shown in FIG. 5 is mounted to a wall (not shown) by means of a backing board 54 attached to the proximal end of a leg portion 52b of the L-pad. With the dock shelter viewed from outside of the building, the L-pad 52 and bottom seal 50 combination shown in FIG. 5 would be positioned on the right hand side of the aperture in the building's wall. Additional views of the bottom seal 50, such as a lower perspective view, a top plan view, and a partially cutaway side plan view, are respectively shown in FIGS. 9, 10 and 11.

The bottom seal 50 includes a tapered upper portion forming an apex 50a at the top edge of the bottom seal. The upper portion of the bottom seal has a generally pyramidal shape, with the apex 50a positioned in contact with the inner edge 52c of the L-pad 52. The inner edge 52c of the L-pad 52 is formed by the adjacent inner surfaces of its body portion 52a and its leg portion 52b. The bottom seal 50 includes an inner core 57, as shown in FIG. 11, which is comprised of a compressible, resilient material such as any suitable resin or polymer, with the preferred material being a foamed polyester. Disposed about the upper tapered portion 56 of the bottom seal 50 is a cover, or casing, 55 which may be made of any suitable material, but preferably is comprised of a flexible, water-repellent, wear resistant material, such as, for example, canvas duck, rubber impregnated nylon fabric, or hypalon.

A plan view of the L-pad cover 55 in an unfolded condition is shown in FIG. 12. From this figure it can be seen that the pad cover 55, when folded around the pad core along the dotted lines of the figure is formed into four triangular sections, each of which is positioned over a corresponding upper triangular surface of the pad's core. A sufficient amount of the cover 55 adjacent to its edges is provided so that the cover can be folded over the lower edges of the bottom seal's core 57.

Extending from the apex 50a of the bottom seal 50 is a loop 64. Positioned adjacent to the apex 50a of the bottom seal 50 and formed on the inner edge 52c of the L-pad 52 is another loop 62. The loop 62 may be formed on the inner edge 52c of the bottom seal 50 by incorporating two adjacent slits on the inner surface of the L-pad 52. The bottom seal's upper loop 64 is coupled to the L-pad's upper loop 62 by means of an upper S-hook 60. By securely attaching the bottom seal's apex 50a to the inner edge 52c of the L-pad 52, sagging of the bottom seal when not engaged and compressed by a truck is prevented. The upper tapered portion 56 of the bottom seal 50 prevents debris from collecting within the L-pad 52 and inhibiting its proper operation and possibly even damaging its structure.

As shown in the various figures, the upper tapered portion 56 of the bottom seal 50 includes four sides and is in the general form of a pyramid. However, the bottom seal 50 of the present invention is not limited to a four sided upper portion and may have virtually any number of upper tapered sides provided that two of its sides are aligned parallel to and in intimate contact with the inner surfaces of the L-pad's body and leg portions 52a and 52b. Extending downward from the upper tapered portion 56 of the bottom seal 50 is a lower flap, or skirt, 58. The lower edge of the flap 58 extends downward from two sides of the bottom seal 50, with one of these sides positioned adjacent to the wall 72 and the other side facing inward toward the aperture 74 in the wall. The flap 58 is preferably comprised of a flexible, wear resistant, water-repellent material.

As shown in FIG. 8, the base 50b of the bottom seal 50 is in the form of a quadrilateral and includes a mesh bottom 59. The mesh bottom 59 provides for drainage and drying of the bottom seal's foam core and allows the foam core to "breathe". This breathing effect allows the bottom seal 50 to return to its original shape almost immediately following its deflection by a truck for preventing the bottom seal from becoming mishappen and assuming an irregular permanent set. The mesh bottom 59 may be securely attached to the bottom overlapping fringes of the pad cover 55 by conventional means such as stitching.

From FIG. 8, it can be seen that extending from a lower corner of the bottom seal's cover 55 is a lower loop 65. Another lower loop 63 is attached to or formed in the cover on the bottom surface of the L-pad 52. The lower loops 65 and 63 of the bottom seal 50 and the L-pad 52 are securely coupled together by means of a lower S-hook 61. In this manner, a lower edge of the bottom seal 50 is maintained in intimate contact with the inner edge 52c of the L-pad 52 adjacent to its lower end. The upper and lower loop and S-hook arrangements thus maintain the bottom seal 50 along its entire height in intimate contact with the inner edge 52c of the L-pad 52 regardless of whether the L-pad is in the unused, undeflected state or is engaged and deformed by a truck using the dock seal. As shown in FIGS. 8 and 9, the lower edges of the bottom seal's cover 55 extend around beyond the lower edges of the bottom seal and cover peripheral portions of the bottom seal's base 50b.

Referring to FIG. 13, there is shown a plan view of the mesh bottom 59 of the bottom seal in an unfolded condition. FIG. 14 is a partial plan view of the bottom seal's lower flap 58. FIG. 15 is a sectional view of a lower portion of the bottom seal 50 illustrating the seal's foam core 57 with its lateral portions enclosed by the cover 55 and its lower surface covered by the mesh bottom 59. The lower flap 58 is securely coupled to a lower portion of the bottom seal's cover 55 by conventional means such as stitching and extends below the bottom edge of the seal's foam core 57.

Referring to FIG. 6, there is shown a perspective view of a left bottom seal 68 positioned within and coupled to a left L-pad 70 in accordance with the present invention. The proximal end of a body portion 70a of the left L-pad 70 is coupled to the wall 72 adjacent to an opening therein. The bottom seal 68 includes an upper tapered portion 78 and a bottom positioned adjacent to and generally in alignment with the lower edge of the left L-pad 70. Extending downward from the left L-pad 70 is a lower flap 80 which is positioned slightly above a foam seal 74 and a bumper 76 mounted to and extending outward from the wall 72. The upwardly tapered lateral walls of the left bottom seal 68 meet in an apex which is positioned in intimate contact with an inner edge of the left L-pad 70.

Referring to FIGS. 16, 17 and 18, left and right L-pads 90, 92 incorporating respective bottom seals 104 and 106 are shown in the undeflected as well as in the deflected configurations. As shown in FIG. 16, prior to engagement of tghe L-pads 90, 92 by a truck 102, the left and right bottom seals 104 and 106 are in abutting contact with the inner surfaces of their respective L-pads and with the adjacent outer portion of the wall 94. As the L-pads 90 and 92 are deflected inwardly by the truck 102, the left and right bottom seals 104, 106 are compressed, while continuing to remain in intimate contact with the wall 94 and the inner surfaces of the left and right L-pads 90, 92. When fully deflected by the truck 102 as shown in FIG. 18, with the respective leg portions 90b and 92b of the left and right L-pads 90, 92 bent fully rearward, the left and right bottom seals 104, 106 remain in intimate contact with the inner surfaces of their associated L-pads as well as with portions of the wall 94 adjacent to the aperture 96 therein. In addition, it can be seen that each of the bottom seals 104, 106 is in intimate contact with aft, lateral edges of the truck 102.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. For use with a loading dock shelter including an L-pad attached to a wall for engaging an aft portion of a truck positioned adjacent to the loading dock, wherein a portion of the L-pad is in spaced relation from the wall so as to form a gap therebetween, a bottom seal comprising:

a compressible, resilient tapered pad having a generally flat base and an upper tapered portion forming an apex on said pad, wherein said base is positioned adjacent to and in contact with a lower edge of the L-pad and the wall adjacent thereto and fills the gap between the wall and the lower edge of the L-pad; and means for attaching said tapered pad to an inner portion of the L-pad facing the wall so as to maintain said tapered pad in intimate contact with the wall and an inner portion of the L-pad so that said tapered pad fills the gap therebetween when the L-pad is engaged and deflected by a truck.

2. The bottom seal of claim 1 wherein said base has a plurality of sides in intimate contact with the wall and adjacent inner sides of the L-pad.

3. The bottom seal of claim 2 wherein said base is a quadrilateral and the upper tapered portion of said pad includes four sides each extending upward from one of the sides of said base.

4. The bottom seal of claim 3 wherein the L-pad includes a body portion mounted to and extending from the wall, a leg portion extending from a distal end of said body portion and an inner edge disposed between said body and leg portions, and wherein said means for attaching said tapered pad couples said tapered pad to the inner corner of the L-pad.

5. The bottom seal of claim 4 wherein said means for attaching said tapered pad includes upper and lower couplers respectively coupling upper and lower portions of said tapered pad to the inner corner of the L-pad.

6. The bottom seal of claim 5 wherein each of said upper and lower couplers includes a respective S-hook.

7. The bottom seal of claim 6 wherein an upper S-hook couples the apex of said tapered pad to the inner corner of the L-pad.

8. The bottom seal of claim 7 wherein a lower S-hook couples a corner of the base of said tapered pad to the inner corner of the L-pad.

9. The bottom seal of claim 1 wherein said tapered pad includes a foam core.

10. The bottom seal of claim 9 wherein said tapered pad further includes a flexible, water-repellent cover disposed about the upper tapered portion thereof.

11. The bottom seal of claim 10 further comprising means coupled to said foam core for allowing said foam core to drain, dry and breathe.

12. The bottom seal of claim 11 wherein said means for allowing said foam core to drain, dry and breathe includes a mesh structure disposed over the tapered pad's base.

13. The bottom seal of claim 10 further comprising a lower flap disposed about said base and extending downward from said cover.

14. The bottom seal of claim 13 wherein said lower flap is comprised of a flexible, water-repellent material.

15. Apparatus attached to a wall adjacent to a lateral edge of an opening therein for providing a seal between the wall and an aft lateral portion of a vehicle being off-loaded or on-loaded through the opening in the wall, said apparatus comprising:

a compressible, resilient L-shaped pad having a body portion mounted to and extending generally perpendicularly outward from the wall and a leg portion extending from a distal end of said body portion in a direction generally parallel to the wall and inwardly toward the aperture in the wall, said L-shaped pad including an inner edge defining the juncture between inner adjacent surfaces of said body and leg portions thereof;

an upwardly tapered compressible, resilient bottom seal positioned adjacent to a lower edge of said L-shaped pad and in intimate contact with the wall and adjacent inner portions of the body and leg portions of said L-shaped pad, said bottom seal including a flat base and a plurality of inwardly sloped side walls extending upward from said base so as to form an apex on said said bottom seal; and means for securely attaching said bottom seal to an inner portion of said L-shaped pad so as to maintain a corner of the base and the apex of said bottom seal in intimate contact with the inner edge of said L-shaped pad.

16. A bottom seal for a loading dock shelter including an L-shaped pad mounted to a wall adjacent to an opening therein, said bottom seal comprising:

a compressible, resilient core disposed between and in contact with the L-pad and an adjacent portion of the wall so as to completely fill a gap therebetween, said core having a flat bottom portion and a tapered upper portion extending upward therefrom, said upper portion including an apex therein;

a flexible, water-repellent cover disposed in tight fitting relation about the upper portion of said core;

a mesh structure disposed over the bottom portion of said core to allow for drainage and drying of said core and to permit said core to breathe; and coupling means for attaching the apex and a lower portion of said cover to the inner portion of the L-pad so as to maintain the bottom seal in intimate contact with the L-pad and an adjacent portion of the wall and to completely block the gap therebetween when the L-pad is not engaged by a truck as well as when the L-pad is engaged and deflected by a truck using the dock shelter.

* * * * *